(12) United States Patent
Lee et al.

(10) Patent No.: US 9,752,558 B2
(45) Date of Patent: Sep. 5, 2017

(54) APPARATUS HAVING A FLYWHEEL

(71) Applicant: Nurielecom Co., Ltd., Gwangju (KR)

(72) Inventors: Jong Bae Lee, Gwangju (KR); In Duk Kim, Gwangju (KR); Jong Sun Kim, Gwangju (KR)

(73) Assignee: NURIELECOM CO., LTD., Gwangju (KR)

( * ) Notice: Subject to any disclaimer, the term of this patent is extended or adjusted under 35 U.S.C. 154(b) by 0 days.

(21) Appl. No.: 14/946,683

(22) Filed: Nov. 19, 2015

(65) Prior Publication Data

US 2017/0009741 A1    Jan. 12, 2017

(30) Foreign Application Priority Data

Jul. 6, 2015   (KR) .................. 10-2015-0095736

(51) Int. Cl.

| F03D 9/00 | (2016.01) |
| H02P 9/04 | (2006.01) |
| F03D 7/02 | (2006.01) |
| H02K 7/02 | (2006.01) |
| F03D 9/25 | (2016.01) |
| H02K 7/18 | (2006.01) |
| H02P 9/02 | (2006.01) |

(52) U.S. Cl.
CPC ............. *F03D 7/0204* (2013.01); *F03D 9/25* (2016.05); *H02K 7/02* (2013.01); *H02K 7/183* (2013.01); *F05B 2260/421* (2013.01); *H02P 9/02* (2013.01); *Y02E 10/723* (2013.01)

(58) Field of Classification Search
CPC ....................................................... H02P 6/16

USPC .................................................... 290/44, 55
See application file for complete search history.

(56) References Cited

U.S. PATENT DOCUMENTS

| 3,799,137 | A | * | 3/1974 | Reddy | ...................... F02P 11/02 |
| | | | | | 123/149 D |
| 4,086,505 | A | * | 4/1978 | McDonald | ............. H02K 53/00 |
| | | | | | 310/74 |
| 4,307,443 | A | * | 12/1981 | Rettew, Jr. | ................. F02P 3/02 |
| | | | | | 363/107 |
| 6,630,806 | B1 | * | 10/2003 | Brits | ...................... H02K 23/62 |
| | | | | | 318/400.01 |
| 8,749,083 | B2 | * | 6/2014 | Nomoto | .................... F03D 1/04 |
| | | | | | 290/44 |
| 2011/0068582 | A1 | * | 3/2011 | Dugas | .................. F03D 1/0658 |
| | | | | | 290/55 |
| 2013/0043679 | A1 | * | 2/2013 | Nomoto | .................... F03D 1/04 |
| | | | | | 290/44 |
| 2016/0025067 | A1 | * | 1/2016 | Pristash | .................. F03D 9/007 |
| | | | | | 290/55 |
| 2016/0065032 | A1 | * | 3/2016 | Sanders | ................. H02K 7/025 |
| | | | | | 74/572.11 |
| 2017/0009742 | A1 | * | 1/2017 | Park | .......................... F03D 9/25 |

FOREIGN PATENT DOCUMENTS

CN           202798174 U   *  3/2013

\* cited by examiner

*Primary Examiner* — Pedro J Cuevas

(57) ABSTRACT

A flywheel includes a shaft a rotor attached to the shaft. The rotor rotates using the shaft as a central axis. The rotor includes at least one magnet along an outer circumferential surface thereof, at least one coil spaced apart from the rotor in a radial direction. The coil may form a magnetic field that exerts a magnetic force on the magnets when current is supplied to the coil by an electric circuit, thus mitigating fluctuations in rotation of the rotor.

13 Claims, 8 Drawing Sheets

APPARATUS HAVING A FLYWHEEL

CROSS-REFERENCE TO RELATED APPLICATION

This application claims the benefit of Korean Patent Application No. 10-2015-0095736, filed on Jul. 6, 2015, which is hereby incorporated by reference in its entirety.

BACKGROUND

1. Field

The present disclosure relates to a flywheel. More specifically, the present disclosure relates to an apparatus which maintains or increases rotational inertia of a flywheel by inducing an electromagnetic interaction between the flywheel and a coil.

2. Discussion of the Background

Recently, generating electricity using wind power has been heralded as form of clean energy, as well as photovoltaic power generation, hydroelectric power generation, and the like.

In general, wind power generators include a rotation shaft attached to blades. When wind pushes the blades, the rotation shaft rotates. A generator may generate electricity from the mechanical energy of the rotation shaft.

Since wind power generators generate electricity by means of rotational force that rotates blades by using wind, the amount of electricity generated depends on the strength of the wind pushing the blades.

Conventional wind power generators only produce storable electricity when the rotation shaft reaches a certain rotation rate. In other words, wind must push the blades by a predetermined strength in order to rotate the blades at a sufficient rate to generate electricity.

However, since wind fluctuates significantly, the generation of electricity using conventional wind power generators may be sporadic. In particular, it may take time for a conventional wind power generator to reach a certain rotation rate to generate storable electricity.

SUMMARY

The present disclosure provides a flywheel in which fluctuations in the rotation of a rotating body are mitigated to improve rotational inertia.

Embodiments of the present disclosure provide an apparatus comprising a plurality of blades coupled to a rotation center body, an electric generator configured to generate electricity when the rotation center body rotates, a flywheel including a rotor coupled to the rotation center body, and a magnet attached to an outer surface of the rotor; and a trigger coil spaced apart from the rotor in a radial direction and coupled to an electric circuit; the trigger coil configured to exert a magnetic force on the magnet when the electronic circuit supplies the trigger coil with current.

Embodiments of the present disclosure provide provide the apparatus, further comprising a housing, a rotation shaft extending from a first side of the housing and a support physically supporting the housing, wherein the housing is configured to rotate with respect to the support.

Embodiments of the present disclosure provide the apparatus, further comprising the rotation center body having a sleeve shape, wherein the magnet has a magnetic moment pointed in a nonzero angle with respect to the rotation center body.

Embodiments of the present disclosure provide the apparatus, wherein the magnet is a permanent magnet.

Embodiments of the present disclosure provide the apparatus, wherein the magnet has a rectangular parallelpiped shape.

Embodiments of the present disclosure provide the apparatus, wherein the magnet is one of a plurality of magnets disposed on the outer surface of the rotor, each of the plurality of magnets having an N-pole pointed radially from the rotor.

Embodiments of the present disclosure provide the apparatus, wherein the trigger coil includes a plurality of wound bifilar coils that are stacked and connected in series.

Embodiments of the present disclosure provide the apparatus, wherein each of the plurality of bifilar coils includes a spiral-shaped primary coil, and a spiral-shaped secondary coil adjacent to the primary coil, each of the primary coil and the secondary coil disposed on a common plane.

Embodiments of the present disclosure provide the apparatus, wherein the electric circuit is configured to supply a pulse-type current to the trigger coil.

Embodiments of the present disclosure provide the apparatus, wherein the electric circuit includes a rechargeable battery coupled to the electric generator, first and second transistors, first and second diodes, and a capacitor.

Embodiments of the present disclosure provide the apparatus wherein the pulse-type current has a frequency that aligns with a rotational frequency of the rotor.

Embodiments of the present disclosure provide the apparatus further comprising a tail body extending from a second side of the housing, the second side being opposite to the first side and a vertical tail wing connected to the tail body.

Embodiments of the present disclosure provide a flywheel, comprising a rotor coupled to a rotation center body, the rotor configured to rotate, a magnet attached to an outer surface of the rotor, a coil that is spaced apart from the rotor in a radial direction, wherein the coil part includes a trigger coil configured to form magnetic fields when current is supplied to the trigger coil and a circuit configured to supply a current to the trigger coil when the magnet passes a center of the trigger coil.

Embodiments of the present disclosure provide a method of rotating a rotor, comprising generating an attractive magnetic force between a trigger coil and a magnet attached to the rotor by inducing a first current signal in a trigger coil when the magnet approaches the trigger coil and generating a repulsive magnetic force between the trigger coil and the magnet by inducing a second current signal in the trigger coil when the magnet passes the trigger coil.

DETAILED DESCRIPTION OF THE ILLUSTRATED EMBODIMENTS

Hereinafter, specific embodiments will be described in detail with reference to the accompanying drawings. The present disclosure may, however, be embodied in different forms and should not be construed as limited to the embodiments set forth herein. Other embodiments may still be utilized and structural and functional modifications may be made without departing from the scope and spirit of the present disclosure.

Like reference numerals are used for referring to the same or similar elements in the description and drawings.

Figure 1:
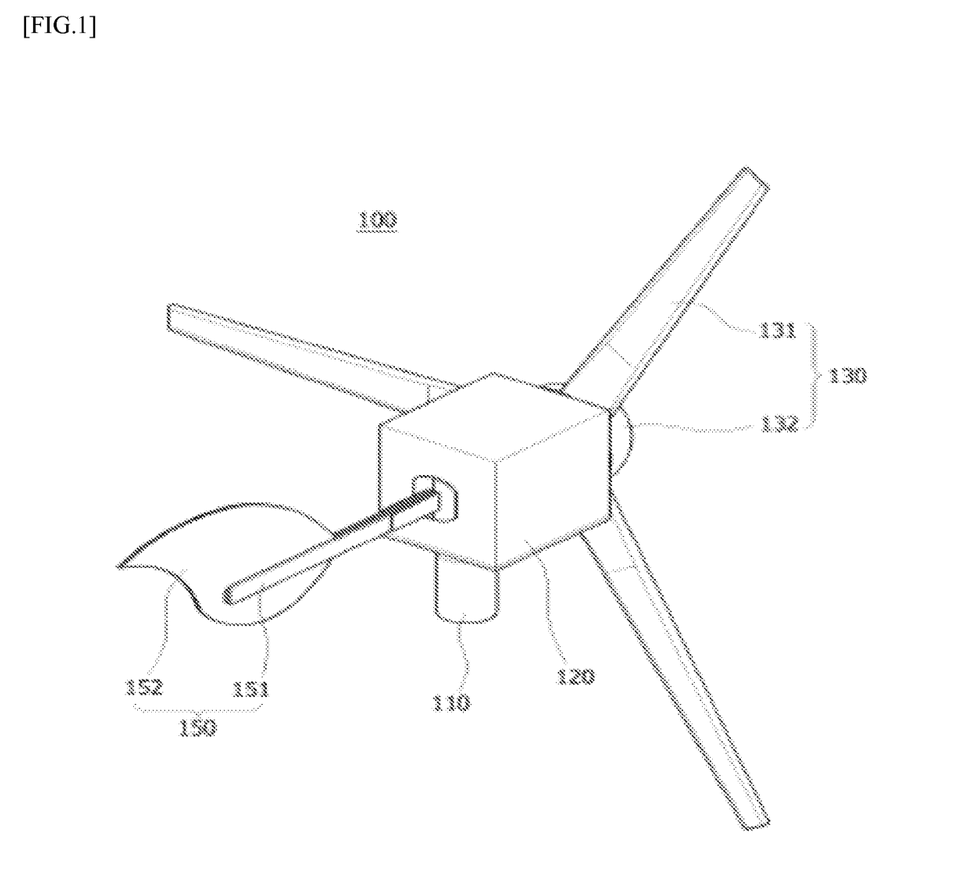
FIG. 1 is a perspective view of a wind power generator including a flywheel according to an embodiment of the present disclosure.
Figure 2:
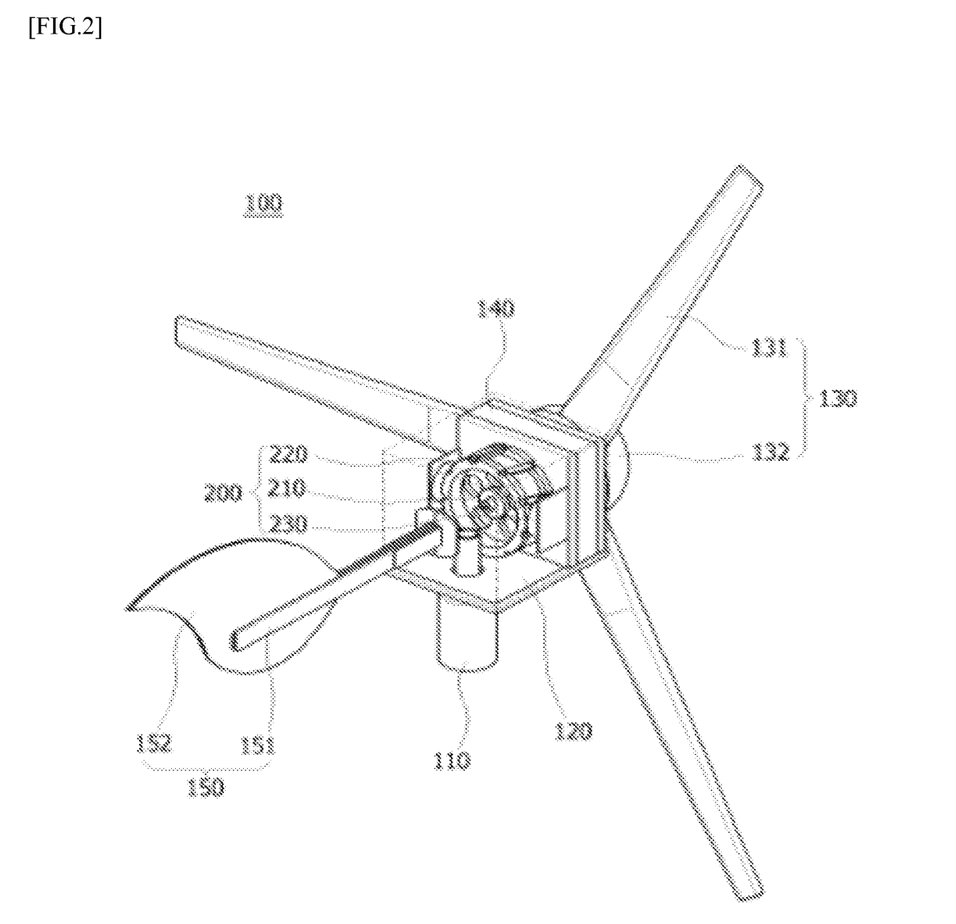
FIG. 2 is a perspective view illustrating the wind power generator without a portion of a housing according to an embodiment of the present disclosure.

FIG. 1 is a perspective view of a wind power generator 100 including a flywheel 200 according to an embodiment of the present disclosure, and FIG. 2 is a perspective view illustrating the wind power generator 100 without a portion of a housing 120 according to an embodiment of the present disclosure.

Referring to FIGS. 1 and 2, the wind power generator 100 according to an embodiment of the present disclosure may include a support part 110, the housing 120, a blade part 130, an electric generator 140, the flywheel 200, and a tail part 130.

The support part 110 may be fixed to a fixing structure (not shown). The support part 110 may physically support the wind power generator 100.

The housing 120 may enclose the electric generator 140 and the flywheel 200, which will be described below. Also, the housing 120 may be connected to and rotate with respect to an upper portion of the support part 110. That is, the housing 120 may pivot around a connection point between the housing 120 and the support part 110.

The blade part 130 may be connected to and rotate with respect to a first side of the housing 120. That is, the blade part 130 may rotate with respect to the first side of the housing 120. The blade part 130 may include at least one blade 131 attached to a rotation shaft 132. Wind may exert a force on the blade 131, so that the rotation shaft 132 rotates by wind power when the wind blows.

The electric generator 140 may generate electricity by converting mechanical energy from the rotating blade part 130 to electric energy.

The tail part 150 may include a tail body 151 fixed to a second side of the housing 120 and a tail wing 152 connected to the tail body 151. The tail wing 152 may have a vertical wing shape. Wind may exert a force on the tail wing 152, causing the housing 120 to rotate according to a change in a wind direction. Accordingly, the blade part 130 attached to the housing may face the direction from which the wind blows and thus increase electrical power generation efficiency.

Figure 3:
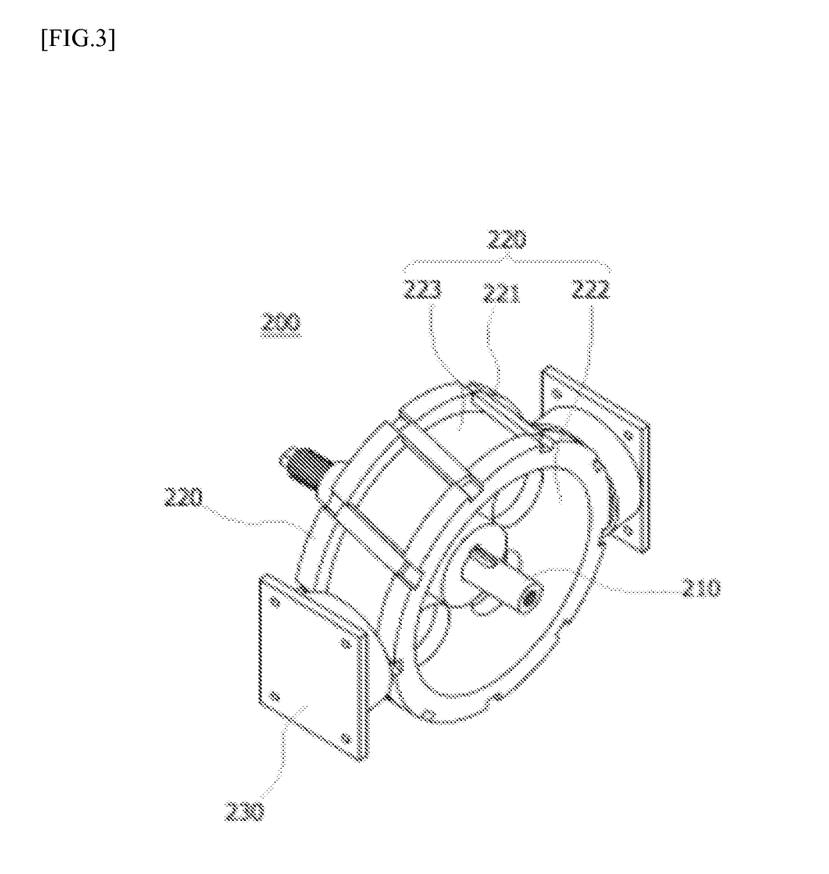
FIG. 3 is a perspective view of the flywheel according to an embodiment of the present disclosure.
Figure 4:
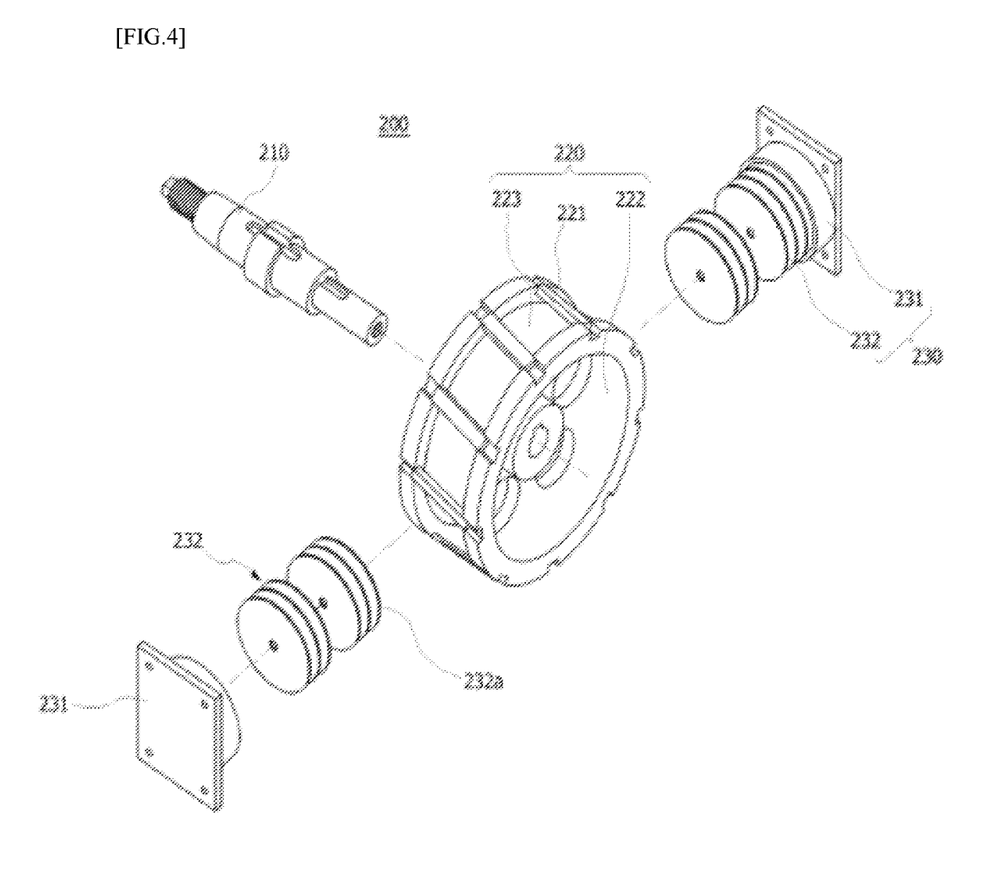
FIG. 4 is an exploded perspective view of the flywheel according to an embodiment of the present disclosure.

FIG. 3 is a perspective view of the flywheel 200 according to an embodiment of the present disclosure, and FIG. 4 is an exploded perspective view of the flywheel 200 according to an embodiment of the present disclosure.

Referring to FIGS. 3 and 4, the flywheel 200, according to an embodiment of the present disclosure, may include a rotation center body 210, a rotor 220 coupled to the rotation center body 210, a coil part 230 disposed on an outer portion of the rotor 220 and pointed in a radial direction, and a electric circuit 240 electrically connected to the coil part 230. The rotor 220 may be configured to rotate with the rotation center body 210.

An axial direction represents a longitudinal direction of the rotation center body 210 of FIG. 3, that is, a direction from one side of the rotor 220 to an opposite side of the rotor 220. The radial direction represents a direction from the rotation center body 210 toward an outer circumferential surface of the rotor 220 or a direction from the outer circumferential surface of the rotor 220 toward the rotation center body 210.

The rotation center body 210 may have a shaft or sleeve shape. A center of rotation of the rotation center body 210 may be aligned with a center of rotation of the blade part 130 and the electric generator 140.

The rotor 220 may be coupled to the rotation center body 210. The rotor 220 may rotate together with the blade part 120.

The rotor 220 may include a rotor body 222, a circular ring-shaped outer ring 223 coupled to an outer circumferential surface of the rotor body 222, and at least one permanent magnet 221 disposed on the outer circumferential surface of the outer ring 223. Here, the permanent magnet 221 may have an N-pole pointed away from the outer ring 223 in the radial direction and an S-pole pointed towards the outer ring 223 in the radial direction. The permanent magnet 221 may be a plurality of magnets spaced apart from each other by a predetermined distance, and disposed on the outer circumferential surface of the rotor 220 along the outer circumference of the rotor 220.

The permanent magnet 221 be a Neodymium magnet and may have a rectangular parallelepiped shape. Also, the permanent magnet 221 may have a magnetic moment that is pointed in a nonzero, predetermined angle with respect to the rotation center body 210 in order to minimize cogging torque and improve the rotational efficiency of the rotation center body 210.

The rotor body 222 may be formed of a nonmagnetic material. For example, the rotor body 222 may be formed of plastic.

The outer ring 223 may be formed of a ferromagnetic material. For example, the outer ring 223 may be formed of iron, nickel, cobalt, or an alloy containing at least one of iron, nickel, and cobalt.

The coil part 230 may include a coil housing 231 having an opening, and a trigger coil 232 seated inside the opening of the coil housing 231. When current is supplied to the trigger coil 232, a magnetic field may be formed around the trigger coil 232. That is, the trigger coil 232 may be an inductor. The coil part 230 may be spaced apart from an outer edge of the outer ring 223 of the rotor 220.

Figure 5:
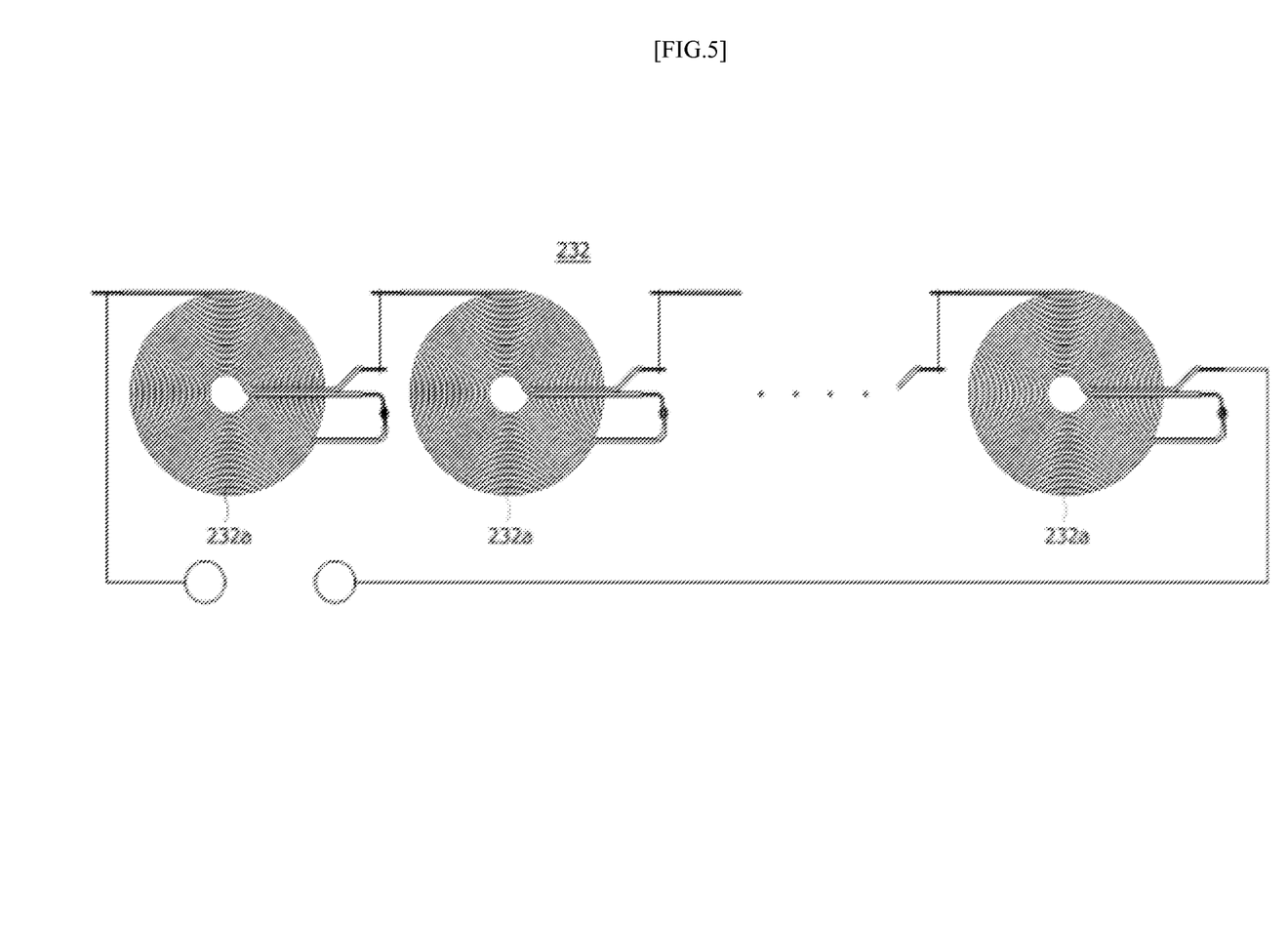
FIG. 5 is a conceptual view of a trigger coil according to an embodiment of the present disclosure.
Figure 6:
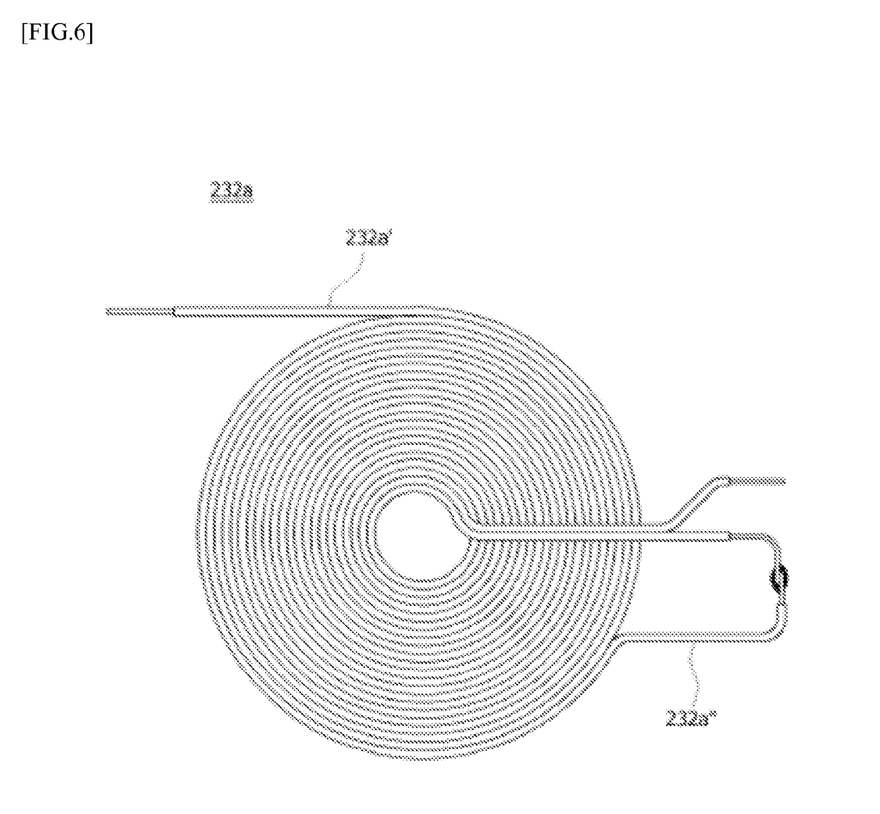
FIG. 6 is a view of a bifilar coil according to an embodiment of the present disclosure.

FIG. 5 is a conceptual view of the trigger coil 232, and FIG. 6 is a view of a bifilar coil 232a. Referring to FIG. 5, the trigger coil 232 may include a plurality of wound bifilar coils 232a that are stacked. The plurality of bifilar coils 232a may be connected to each other in series.

Each of the plurality of bifilar coils 232a may include a primary coil 232a' and a secondary coil 232a" that are adjacent to each other. The primary coil 232a' and the secondary coil 232" are each wound in a spiral shape along a common plane. An inner end of the primary coil 232a' may be connected to an outer end of the secondary coil 232a".

Although the bifilar coil 232a is wound in a disk shape as illustrated in FIG. 5, the embodiment of the present disclosure will not be limited thereto. For example, the bifilar coil 232a may be wound in an oval plate shape or a rectangular shape having a rounded edge. In other words, the bifilar coil 232a may be wound in various shapes to maximize a range of magnetic fields affecting the permanent magnet that depend on the shape of the permanent magnet 221.

When the current is supplied to the trigger coil 232, the magnetic field may be formed around the trigger coil 232. The magnetic field may induce the N-pole and the S-pole of the permanent magnet 221 according to the direction of the current.

Figure 7:
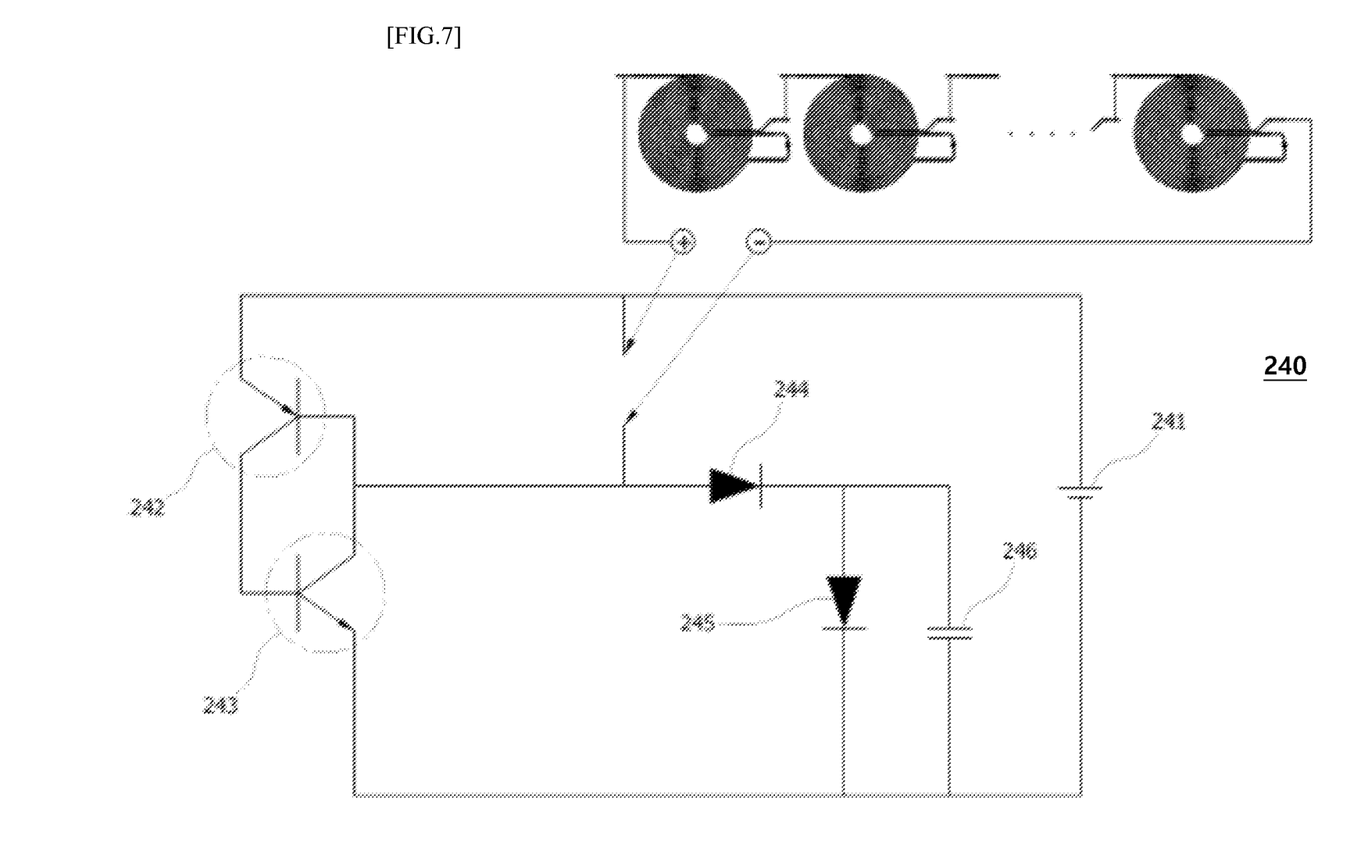
FIG. 7 is a circuit diagram of a electric circuit according to an embodiment of the present disclosure.

FIG. 7 is a circuit diagram of the electric circuit 240 according to an embodiment of the present disclosure.

Referring to FIG. 7, the electric circuit 240 may include a rechargeable battery 241 that supplies DC current, first and second transistors 242 and 243, first and second diodes 244 and 245, and a capacitor 246.

The battery 241 may be electrically connected to the electric generator 140 and may be charged with electricity generated by the electric generator 140.

If a conventional wind power generator generates electric power above a predetermined value, the electric power is transmitted to a power system using an inverter or used to charge a battery having a large capacity. However, if the conventional wind power generator generates electric power below the predetermined value, the electric power is discarded because it cannot sufficiently supply a capacitor or battery with enough voltage or current to charge the capacitor or battery.

In contrast, the wind power generator 100 according to an embodiment of the present disclosure may charge the battery 241 by using generated power below the predetermined value.

The battery 241 may be charged by a solar power generator (not shown) disposed outside the housing 120. For example, the battery 241 may be charged by a solar cell. However, the embodiment of the present disclosure will not be limited thereto, and the battery 241 may be charged by various methods known to a person who is ordinary skilled in the art, for example, by using a piezoelectric element or a Stirling engine.

The electric circuit 240 may be electrically connected to the trigger coil 232 and supply current to the trigger coil 232. The electric circuit 240 may supply a pulse-type current to the trigger coil 232. For example, when the permanent magnet 221 disposed in the rotor 220 approaches the trigger coil 232, current is induced in the trigger coil 232, and when the permanent magnet 221 passes a center of the trigger coil 232, the electric circuit 240 may supply current to the trigger coil 232. When the permanent magnet 221 is far away from the trigger coil 232, e.g., on an opposite side of the rotor 220, the electric circuit 240 may cease to supply current to the trigger coil 232. That is, the electric circuit 220 may supply the pulse-type current to the trigger coil 232 in conformity with a cycle in which the permanent magnet 221 passes the center of the trigger coil 232 according to rotation of the rotor 220. That is, a frequency of the pulse-type current may be substantially equal to a rotational frequency of the rotor 220.

When the electric circuit 240 supplies the current to the trigger coil 232, and the N-pole magnetic field of the trigger coil 232 is formed toward the rotor 220 in the radial direction, a repulsive force is generated between the trigger coil 232 and the permanent magnet 221, which has an N-pole pointed away from the rotor 220 in the radial direction. This repulsive force may push the permanent magnet 221 away from the trigger coil 232, thereby causing the rotor 220 to rotate. When the permanent magnet 221 is far away, e.g., on an opposite side of the rotor 220, from the trigger coil 232, current is not supplied to the trigger coil 232, and thus the permanent magnet no longer induces the magnetic field. The trigger coil 232 may be repeatedly activated and deactivated by the electric circuit 240 to rotate the rotor 220.

In an embodiment, the coil part 230 may be one of a plurality of coil parts, and the permanent magnet 221 may be one of a plurality of permanent magnets. Two of the plurality of magnets may be positioned without passing central portions of two of the plurality of trigger coils 232 simultaneously.

Hereinafter, an operation of the flywheel 200 according to an embodiment of the present disclosure will be described.

Figure 8:
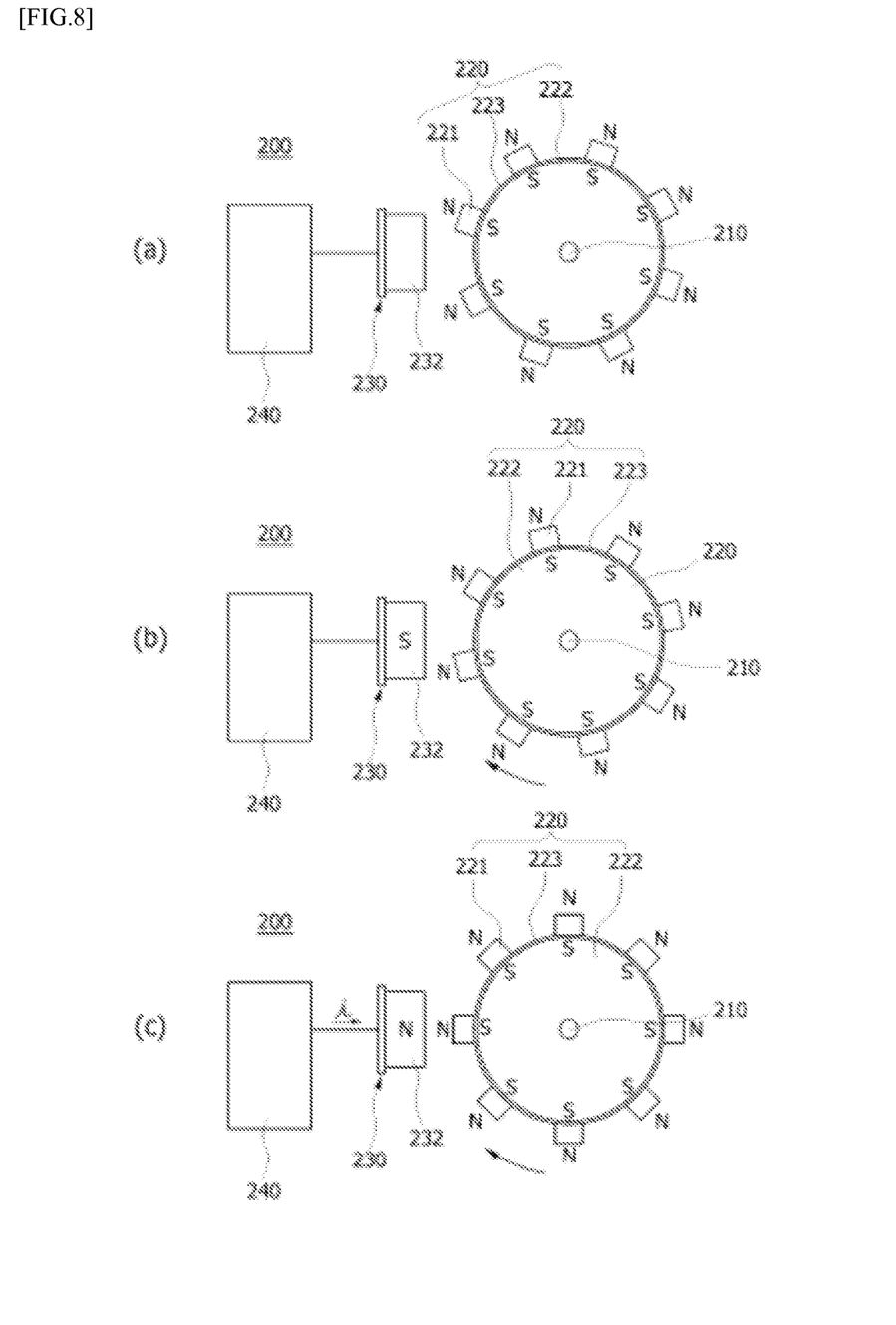
FIG. 8 is a conceptual view illustrating an operation of the flywheel according to an embodiment of the present disclosure.

FIG. 8 is a conceptual view illustrating an operation of the flywheel 200 according to an embodiment of the present disclosure.

Since the electric circuit 240 does not induce current in the trigger coil 232 unless the permanent magnet 221 approaches the trigger coil 232, the electric circuit 240 does not induce a magnetic force between the trigger coil 232 and the permanent magnet 221 when the rotor 220 is in a stopped state as illustrated in FIG. 8(a). When the rotor 220 is in the stopped state, the electric circuit 240 does not consume any power.

As illustrated in FIG. 8(b), when the rotor 220 is rotated by an external force and the permanent magnet 221 approaches the trigger coil 232, the trigger coil 232 applies a first current signal to the trigger coil 232. The S-pole of the trigger coil 232 may be instantaneously generated toward the rotation center body 210 in the radial direction due to the first current signal, and thus an attractive force may be generated between the trigger coil 232 and the permanent magnet 221.

As illustrated in FIG. 8(c), when the permanent magnet 221 passes the center of the trigger coil 232, the electric circuit 240 supplies a second current signal to the trigger coil 232, and thus the trigger coil 232 may form the N-pole magnetic fields toward the rotation center body 210 in the radial direction. Accordingly, a repulsive force may be generated between the trigger coil 232 and the permanent magnet 221.

The first current signal and the second current signal may be pulse-type current signals. The first and second current signals may be alternatingly applied to the trigger coil 232. Accordingly, magnetic forces between the trigger coil 232 and the permanent magnet 221 may keep the rotor 220 rotating continuously. That is, even when the external force applied to the rotor 220 is completely removed, the rotor 220 may be continuously rotated by the magnetic interaction between the trigger coil 232 and the permanent magnet 221, as well as the inertia of the rotor 220. However, as time elapses, the rotor 220 may be gradually slow and stop.

The external force applied to the rotor 220 may be supplied by the blade part 110 rotating from wind power. In other words, when wind rotates the blade part 110, the rotor 220 may rotate together with the blade part 110, and the electromagnetic interaction between the trigger coil 232 and the permanent magnet 221 may provide assistance to the rotational force of the blade 110 and the rotor 220. Thus, the rotation rate of the rotor 220 may be maintained over a short time, even if the wind temporarily ceases, in order to increase the electricity generation efficiency of the electric generator 140.

In addition, since the blade is rotated for a predetermined time by the operation of the flywheel 200 after the wind is stopped, the electric generator 140 may efficiently generate electricity even though the wind blows inconsistently.

In the flywheel according to the present disclosure, fluctuations in the rotation of the rotating body are mitigated to improve rotational inertia.

Although an example of a wind power generator having a flywheel according to an embodiment of the present disclosure is described in the above description, the embodiment of the present disclosure will not be limited thereto, and the flywheel may be applied to various apparatuses that use rotational forces.

Although a preferred embodiment of the present disclosure has been disclosed, various changes and modifications may be made thereto by one skilled in the art without departing from the scope and spirit of the disclosure as set forth in the appended claims.

What is claimed is:

1. An apparatus, comprising:
a plurality of blades coupled to a rotation center body; an electric generator configured to generate electricity when the rotation center body rotates;
a flywheel including a rotor coupled to the rotation center body, and a magnet attached to an outer surface of the rotor; and
a trigger coil spaced apart from the rotor in a radial direction and coupled to an electric circuit; the trigger coil configured to exert a magnetic force on the magnet when the electronic circuit supplies the trigger coil with current,
wherein the magnet is one of a plurality of magnets disposed on the outer surface of the rotor, each of the plurality of magnets having an N-pole pointed radially from the rotor.

2. The apparatus of claim 1, further comprising:
a housing, a rotation shaft extending from a first side of the housing; and
a support physically supporting the housing,
wherein the housing is configured to rotate with respect to the support.

3. The apparatus of claim 1, further comprising:
the rotation center body having a sleeve shape,
wherein the magnet has a magnetic moment pointed in a nonzero angle with respect to the rotation center body.

4. The apparatus of claim 1, wherein the magnet is a permanent magnet.

5. The apparatus of claim 4, wherein the magnet has a rectangular parallel piped shape.

6. The apparatus of claim 1, wherein the trigger coil includes a plurality of wound bifilar coils that are stacked and connected in series.

7. The apparatus of claim 6, wherein each of the plurality of bifilar coils includes a spiral-shaped primary coil, and a spiral-shaped secondary coil adjacent to the primary coil, each of the primary coil and the secondary coil disposed on a common plane.

8. The apparatus of claim 1, wherein the electric circuit is configured to supply a pulse-type current to the trigger coil.

9. The apparatus of claim 8, wherein the electric circuit includes a rechargeable battery coupled to the electric generator, first and second transistors, first and second diodes, and a capacitor.

10. The apparatus of claim 9, wherein the pulse-type current has a frequency that aligns with a rotational frequency of the rotor.

11. The apparatus of claim 2, further comprising:
a tail body extending from a second side of the housing, the second side being opposite to the first side; and
a vertical tail wing connected to the tail body.

12. A flywheel, comprising:
a rotor coupled to a rotation center body, the rotor configured to rotate;
a magnet attached to an outer surface of the rotor;
a coil that is spaced apart from the rotor in a radial direction, wherein the coil part includes a trigger coil configured to form magnetic fields when current is supplied to the trigger coil; and
a circuit configured to supply a current to the trigger coil when the magnet passes a center of the trigger coil,
wherein the magnet is one of a plurality of magnets disposed on the outer surface of the rotor, each of the plurality of magnets having an N-pole pointed radially from the rotor.

13. A method of rotating a rotor, comprising:
generating an attractive magnetic force between a trigger coil and a magnet attached to the rotor by inducing a first current signal in a trigger coil when the magnet approaches the trigger coil; and
generating a repulsive magnetic force between the trigger coil and the magnet by inducing a second current signal in the trigger coil when the magnet passes the trigger coil,
wherein the magnet is one of a plurality of magnets disposed on an outer surface of the rotor, each of the plurality of magnets having an N-pole pointed radially from the rotor.

* * * * *